United States Patent
Cohen et al.

(10) Patent No.: US 10,618,258 B2
(45) Date of Patent: Apr. 14, 2020

(54) FOIL PRINTING

(71) Applicant: HP SCITEX LTD., Netanya (IL)

(72) Inventors: Eytan Cohen, Raanana (IL); Alex Trubnikov, Petach Tiqwa (IL); Benjamin Dayan, Tel-Aviv (IL); Efrat Soroker, Zur Moshe (IL); Shimrit Rubin, Netanya (IL)

(73) Assignee: HP SCITEX LTD., Natanya (IL)

( * ) Notice: Subject to any disclaimer, the term of this patent is extended or adjusted under 35 U.S.C. 154(b) by 0 days.

(21) Appl. No.: 15/772,079

(22) PCT Filed: Jan. 14, 2016

(86) PCT No.: PCT/IB2016/050163
§ 371 (c)(1),
(2) Date: Apr. 29, 2018

(87) PCT Pub. No.: WO2017/122046
PCT Pub. Date: Jul. 20, 2017

(65) Prior Publication Data
US 2018/0319136 A1 Nov. 8, 2018

(51) Int. Cl.
| | | |
|---|---|---|
| B32B 27/08 | (2006.01) | |
| B41M 3/00 | (2006.01) | |
| B44C 1/10 | (2006.01) | |
| C09D 11/101 | (2014.01) | |
| G03G 7/00 | (2006.01) | |
| B41J 3/407 | (2006.01) | |
| B44C 1/17 | (2006.01) | |

(Continued)

(52) U.S. Cl.
CPC ............ B32B 27/08 (2013.01); B32B 5/18 (2013.01); B32B 7/12 (2013.01); B32B 15/046 (2013.01); B32B 15/082 (2013.01); B32B 15/085 (2013.01); B32B 15/09 (2013.01); B32B 15/12 (2013.01); B32B 15/14 (2013.01); B32B 15/20 (2013.01); B32B 23/042 (2013.01); B32B 23/20 (2013.01); B32B 27/10 (2013.01); B32B 27/302 (2013.01); B32B 27/304 (2013.01); B32B 27/306 (2013.01); B32B 27/308 (2013.01); B32B 27/32 (2013.01); B32B 27/36 (2013.01); B32B 27/365 (2013.01); B41J 3/407 (2013.01); B41M 3/006 (2013.01); B44C 1/105 (2013.01); B44C 1/1729 (2013.01); B44C 1/1733 (2013.01); C09D 11/101 (2013.01); C09D 11/107 (2013.01); C09D 11/30 (2013.01); C09J 4/06 (2013.01); C09J 133/06 (2013.01); G03G 7/008 (2013.01); G03G 7/0093 (2013.01); B32B 2250/02 (2013.01); B32B 2255/12 (2013.01); B32B 2266/0235 (2013.01); B32B 2307/406 (2013.01); B32B 2307/732 (2013.01); B32B 2307/748 (2013.01); B41M 7/00 (2013.01); B41M 7/0081 (2013.01); C08F 220/10 (2013.01); C08F 220/18 (2013.01)

(58) Field of Classification Search
CPC .......... C09J 4/06; C09J 133/06; C08F 265/06; C08F 220/10; C08F 220/18; B32B 15/046; B32B 15/082; B32B 15/085; B32B 15/09; B32B 15/12; B32B 15/14; B32B 15/20; B32B 2250/02; B32B 2255/12; B32B 2266/0235; B32B 2307/406; B32B 2307/732; B32B 2307/748; B32B 23/042; B32B 23/20; B32B 27/08; B32B 27/10; B32B 27/302; B32B 27/304; B32B 27/306; B32B 27/308; B32B 27/32; B32B 27/36; B32B 27/365; B32B 5/18; B32B 7/12; B41J 3/407; B41M 3/006; B41M 7/00; B41M 7/0081; B44C 1/105; B44C 1/1729; B44C 1/1733; C09D 11/101; C09D 11/107; C09D 11/30; G03G 7/008; G03G 7/0093
USPC .................................. 156/247, 272.2, 273.3
See application file for complete search history.

(56) References Cited

U.S. PATENT DOCUMENTS

| | | |
|---|---|---|
| 6,605,174 B1 | 8/2003 | Landa et al. |
| 9,044,986 B2 | 6/2015 | Komatsu et al. |

(Continued)

FOREIGN PATENT DOCUMENTS

| | | |
|---|---|---|
| EP | 1310536 | 5/2003 |
| EP | 2666832 | 11/2013 |

(Continued)

OTHER PUBLICATIONS

International Search Report and Written Opinion for International Application No. PCT/IB2016/050163 dated Nov. 30, 2016, 18 pages.

(Continued)

Primary Examiner — Sonya M Sengupta
(74) Attorney, Agent, or Firm — HP Inc. Patent Department

(57) ABSTRACT

Herein is described a method of applying foil from a foil web to a substrate. The method may comprise: ink-jet printing a UV-curable adhesive onto the substrate in a predetermined image area; subjecting the adhesive to a first curing by exposing the adhesive to UV light in a dosage range of 140-170 $mJ/cm^2$; passing the substrate and a foil web through a nip where the foil web is pressed against the adhesive; subjecting the adhesive disposed between the substrate and the foil web to a second curing by exposing the adhesive to UV light in a dosage of at least 250 $mJ/cm^2$; and separating excess foil from the substrate, to leave foil on the predetermined image area. Substrates and UV-curable adhesives are also described.

12 Claims, No Drawings

(51) Int. Cl.
*C09J 4/06* (2006.01)
*C09D 11/30* (2014.01)
*C09D 11/107* (2014.01)
*C09J 133/06* (2006.01)
*B32B 7/12* (2006.01)
*B32B 27/36* (2006.01)
*B32B 27/32* (2006.01)
*B32B 15/082* (2006.01)
*B32B 15/14* (2006.01)
*B32B 15/04* (2006.01)
*B32B 23/20* (2006.01)
*B32B 23/04* (2006.01)
*B32B 15/09* (2006.01)
*B32B 27/30* (2006.01)
*B32B 27/10* (2006.01)
*B32B 5/18* (2006.01)
*B32B 15/085* (2006.01)
*B32B 15/12* (2006.01)
*B32B 15/20* (2006.01)
*B41M 7/00* (2006.01)
*C08F 220/10* (2006.01)
*C08F 220/18* (2006.01)

(56) References Cited

U.S. PATENT DOCUMENTS

| | | |
|---|---|---|
| 2006/0108359 A1 | 5/2006 | Brough et al. |
| 2008/0225099 A1* | 9/2008 | Cohen ............... C09D 11/101 347/102 |
| 2008/0299317 A1 | 12/2008 | Hable |
| 2010/0212821 A1 | 8/2010 | Grinbero et al. |
| 2013/0075040 A1 | 3/2013 | Grinberg et al. |
| 2014/0109828 A1 | 4/2014 | Grinberg |
| 2015/0053131 A1 | 2/2015 | Grinberg et al. |

FOREIGN PATENT DOCUMENTS

| | | |
|---|---|---|
| JP | 2003326845 | 11/2003 |
| JP | 2009226880 | 10/2009 |
| JP | 2009292078 | 12/2009 |
| JP | 2010280858 | 12/2010 |
| WO | WO-02/34521 | 5/2002 |
| WO | WO-2005/026270 | 3/2005 |
| WO | WO-2011/110956 | 9/2011 |
| WO | WO-2013/054317 | 4/2013 |
| WO | WO-2014/113425 | 7/2014 |
| WO | WO-2014/183797 | 11/2014 |
| WO | WO-2015/023262 | 2/2015 |

OTHER PUBLICATIONS

Neira-Velazquez et al,, "Polymer Molecular Weight Measurement", Handbook of Polymer Synthesis, Characterization, and Processing, 2013, 355-366, 1st Edition, John Wiley & Sons.

"UV Curing Applications for Printing", Lightouch UV Curing Systems, AAA Press International, 2009-2017, Arlington Heights, Illinois, USA.

* cited by examiner

FOIL PRINTING

BACKGROUND

Foil printing/stamping processes provide a method for adhering a foil to a substrate in a predetermined image pattern. An adhesive is printed onto the substrate in the area corresponding to a predetermined image area, that is, the area where foil is to be applied. A foil is then brought into contact with the adhesive on the substrate so that it adheres to the areas printed with the adhesive but not to the remaining areas of the substrate.

In hot foil printing/stamping, the printed adhesive is activated by use of heat, causing the foil to adhere to the substrate. In cold foil printing/stamping, the printed adhesive is activated without the use of heat, e.g. by UV irradiation.

DETAILED DESCRIPTION

Before particular embodiments of the present disclosure are disclosed and described, it is to be understood that the present disclosure is not limited to the particular process and materials disclosed herein because such process steps and materials may vary somewhat. It is also to be understood that the terminology used herein is used for describing particular embodiments only. The terms are not intended to be limiting because the scope of protection is intended to be limited by the claims and equivalents thereof.

In describing and claiming the composition and method, the following terminology will be used: the singular forms "a", "an", and "the" include plural referents unless the context clearly dictates otherwise. Thus, for example, reference to "a multifunctional monomer" includes reference to one or more of such materials.

Concentrations, amounts, and other numerical data may be expressed or presented herein in a range format. It is to be understood that such a range format is used merely for convenience and brevity and should be interpreted flexibly to include not just the numerical values explicitly recited as the limits of the range, but also to include all the individual numerical values or sub-ranges encompassed within that range as if each numerical value and sub-range is explicitly recited. For example, a numerical range of "about 1 wt % to about 20 wt %" should be interpreted to include not just the explicitly recited values of 1 wt % to about 20 wt %, but also to include individual values and subranges within the indicated range. Thus, included in this numerical range are individual values such as 2 wt %, 3 wt %, 4 wt %, and sub-ranges such as 5 wt % to 15 wt %, 10 wt % to 20 wt %, and so forth. The same principle applies to ranges reciting a single numerical value. Furthermore, such an interpretation should apply regardless of the breadth of the range or the characteristics being described.

As used herein, the term "about" is used to provide flexibility to a numerical range endpoint by providing that a given value may be a little above or a little below the endpoint or value to allow for variation in test methods or apparatus. The degree of flexibility of this term can be dictated by the particular variable and would be within the knowledge of those skilled in the art to determine based on experience and the associated description herein.

As used herein, a plurality of items, compositional elements, and/or materials may be presented in a common list for convenience. However, these lists should be construed as though each member of the list is individually identified as a separated and unique member. Thus, no individual member of such list should be construed as a de facto equivalent of any other member of the same list solely based on their presentation in a common group without indications to the contrary.

As used herein, unless otherwise indicated, all percentages are by weight (wt %).

If a standard test is mentioned herein, unless otherwise stated, the version of the test to be referred to is the most recent at the time of filing this patent application.

As used herein, "acidity", "acid number", or "acid value" refer to the mass of potassium hydroxide (KOH) in milligrams that neutralizes one gram of a substance. The acidity of a polymer can be measured according to standard techniques, for example, as described in ASTM D1386. If the acidity of a particular polymer is specified, unless otherwise stated, it is the acidity for that polymer alone, in the absence of any of the other components of the adhesive composition.

As used herein, the term "polymer" encompasses both homopolymers and copolymers. As used herein, "copolymer" refers to a polymer that is polymerized from at least two monomers.

As used herein, the term "nipping" refers to the action of holding and/or squeezing at least two items together, which may, for example, be between two rollers.

As used herein, the term "curing" refers to a process of effecting polymerisation of monomers in the UV-curable adhesive, for example by subjecting it to ultraviolet (UV) radiation, which may have the effect of increasing the viscosity of the UV-curable adhesive. In the uncured state, the adhesive compositions of the type disclosed herein may have a low viscosity and/or may be readily jetted. However, upon exposure to a suitable source of curing energy, for example, UV light, electron beam energy, and/or the like, a crosslinked polymer network may be formed.

A certain monomer after curing may be described herein as constituting a certain weight percentage of a polymer. This indicates that the repeating units formed from the said monomer in the polymer constitute said weight percentage of the polymer.

As used herein, the term "pigment" is used generally to refer to pigment colorants, magnetic particles, aluminas, silicas, and/or other ceramics or organometallics, whether or not such particles impart colour. Thus, the term "pigment" can be used generally to describe not just pigment colorants, but also other pigments such as organometallics, ferrites, ceramics, and so forth. The pigment may be a pigment selected from a magenta pigment, a yellow pigment, a cyan pigment and a black pigment.

The present disclosure relates to methods, and compositions for cold foil printing onto a substrate, and substrates formed by cold-form printing. Unless otherwise stated, any feature described herein can be combined with any aspect or any other feature described herein.

The method may comprise ink-jet printing a UV-curable adhesive onto the substrate in a predetermined image area; subjecting the adhesive to a first curing by exposing the adhesive to UV light in a dosage range of 140-170 mJ/cm$^2$; passing the substrate and a foil web through a nip where the foil web is pressed against the adhesive; subjecting the adhesive disposed between the substrate and the foil web to a second curing by exposing the adhesive to UV light in a dosage of at least 250 mJ/cm$^2$; and separating excess foil from the substrate, to leave foil on the predetermined image area. Also disclosed is an adhesive composition comprising an acrylic polymer, a monofunctional monomer, a multifunctional monomer, a photoinitiator. In addition, a substrate having foil adhered thereto by an adhesive is disclosed.

Method of Foil Printing

The first curing initiates a reaction, in some cases a polymerisation reaction, between components of the adhesive, e.g. monomers that are present. The first curing may alter the physical properties, such as the viscosity and/or surface tension, of the adhesive. A UV dosage range of 140-170 mJ/cm$^2$ for the first curing has been found to produce a high quality foil image. Low and high UV dosages were found to lead to poor foil image quality after the excess foil is separated from the substrate. This UV dosage range allows partial but not complete reaction of the components of the adhesive. Without being bound by any theory, too high a UV dosage may cause the reaction to go to completion and reduce the adhesion of the adhesive to the foil and/or substrate, reducing the quality of the foil image, whereas too low a UV dosage may allow the adhesive to maintain too low a viscosity, allowing the adhesive to flow away from the image area and reducing the sharpness of the image. UV dose may be otherwise termed UV energy density. It is the UV dose applied to the UV-curable adhesive (during the first or second curing). UV dosage may be measured using a radiometer, e.g. commercially available radiometers such as a UV Power Puck 2 radiometer from EIT Inc.

In some examples, the UV light may be radiated by a UV lamp (such as an Arc lamp, such as a mercury vapour lamp (with or without additives such as iron or gallium)), a fluorescent lamp, a blue laser, a UV laser, or a UV LED (light emitting diode). In some examples, the UV light is radiated by a UV LED. In some examples, the UV light may be provided by a source of UV radiation operating in continuous mode, in a flash mode or in a pulsed mode.

The UV dosage for the first curing may be applied to the adhesive for an exposure time of less than or equal to about 1 sec. In some examples, the exposure time may be less than or equal to about 0.5 sec. In some examples the exposure time may be less than or equal to about 0.1 sec. In some examples the exposure time may be less than or equal to about 0.05 sec. In some examples the exposure time for the first curing may from 0.01 sec to 0.5 sec, in some examples, from 0.02 sec to 0.1 sec, in some examples from 0.02 sec to 0.08 sec.

The UV dosage for the second curing may be applied to the adhesive for an exposure time greater than for the first curing. In some examples the exposure time may be at least 1.5 times that of the first curing. In some example, the exposure time may be at least twice that of the first curing. In some examples, the exposure time may be at least three times that of the first curing. In some examples, the exposure time for the second curing may be less than or equal to 2 sec. In some examples the exposure time may be less than or equal to 1 sec. In some examples, the exposure time may be less than or equal to 0.5 sec. In some examples the exposure time may be less than or equal to 0.1 sec. In some examples the exposure time may be less than or equal to 0.05 sec. In some examples the exposure time for the second curing may from 0.01 sec to 0.5 sec, in some examples, from 0.02 sec to 0.1 sec, in some examples from 0.02 sec to 0.08 sec.

In some examples, the UV dosage for the second curing may be supplied by a more powerful UV source.

In some examples, during the first and/or second curing, the UV light has a wavelength in a range of from 230 nm to 450 nm, in some examples 315 nm to 450 nm, in some examples from 350 nm to 430 nm, in some examples from 375 nm to 415 nm.

In some examples, the UV light source for the first curing is 5 mm or less away from the adhesive, in some examples 2 mm or less away, in some examples 1 mm or less away, in some examples from 0.1 mm to 5 mm away, in some examples from 0.2 mm to 2 mm away.

In some examples, the UV light source for the second curing is less than 5 mm away from the foil, in some examples 2 mm or less away, in some examples 1 mm or less away, in some examples from 0.1 mm to 5 mm away, in some examples from 0.2 mm to 2 mm away.

In some examples, the substrate is on a conveyer, which moves the substrate through an inkjet printing station to a first UV application station; the conveyer then moves the substrate through a nip at which foil is applied and on through a second UV application station; finally, the conveyer moves the substrate through an excess foil separation station. In some examples, the conveyer is a conveyer belt. In some examples, the conveyer is a series of strategically placed rollers.

In some examples, the nip brings the substrate and foil into contact. In some examples, the nip holds the substrate and foil together without applying pressure. In other examples, the nip applies pressure to the substrate and foil to promote adhesion of the foil to the adhesive composition.

In some examples, the nip comprises a set of rollers, which may comprise one roller above and one below the substrate, adhesive and foil assembly. In some examples, the nip comprises a set of rollers. In some examples the substrate is on a conveyer and the nip comprises a roller above the substrate, adhesive and foil assembly and the conveyer below the substrate, adhesive and foil assembly. In some examples, an additional nip may be present after the adhesive has been subjected to the second curing. In some examples, the rollers may move at the same or different speeds.

In some examples, the method may be repeated to allow different foils to be applied to the substrate. In some such examples, the different foils are applied to a different predetermined image area. In some such examples, the different foils comprise different materials, colours or effects.

Foil Web

In some examples, the foil web may include a foil and a foil backing layer. A "foil backing layer" refers to a layer of detachable material that provides structural support for the foil. In some examples, the foil web does not include a foil backing layer. In some examples in which a foil backing layer is present, the separating of excess foil from the substrate to leave foil on the predetermined image area occurs by separating the foil backing from the substrate, causing foil that has not been in contact with the adhesive to remain on the foil backing.

In some examples, the foil has a thickness of about 200 μm or less. In some example, the foil has a thickness of about 100 μm or less. In some examples the foil has a thickness of about 50 μm or less. In some examples, the foil has a thickness of about 25 μm or less. In some examples, the foil has a thickness of from about 10 μm to 200 μm, in some examples from about 20 μm to 100 μm. In some examples, the foil has a thickness of from about 10 μm to 200 μm, in some examples from about 10 μm to 50 μm, in some examples from about 10 μm to 40 μm, in some examples from about 20 μm to 40 μm.

In some examples, the foil backing layer has a thickness of about 200 μm or less. In some example, the foil backing layer has a thickness of about 100 μm or less. In some examples the foil backing layer has a thickness of about 50 μm or less. In some examples, the foil backing layer has a thickness of about 25 μm or less.

In some examples, the foil comprises a metallic material. The metallic material may be an elemental metal or an alloy of a metal. In some examples, the metallic material may be selected from tin and aluminium. In some examples, the foil comprises a holographic material.

Substrates

In some examples, the substrate may be a non-polar substrate. In some examples, the non-polar substrate may have a low surface energy.

In some examples, the substrate may be selected from a plastic substrate, paper, paper laminated with plastic, gloss-coated paper, cast-coated paper, cardboard, paperboard, foam board, textiles, metal, coated offset media or glass.

In some examples a plastic substrate may comprise a material selected from a styrene, polystyrene, acrylic (such as cast acrylic, extrude acrylic, self-adhesive vinyl film), polycarbonate, polyethylene, polypropylene, fluted polypropylene, polyester, co-extruded polyester, amorphous polyethylene terephthalate, polyethylene terephthalate glycol-modified (PETG), vinyl, poly(vinyl chloride), foam poly(vinyl chloride), poly(vinyl acetal), cellulose diacetate, cellulose triacetate, cellulose propionate, cellulose butyrate, cellulose acetate butyrate, nitrocellulose or poly(methyl methacrylate), or a substrate formed from any combination of these materials.

In some examples, paper substrate may be laminated with any plastic, which may be one of the plastic substrates above, and the foil applied to the plastic. In some examples, the paper may be laminated with polyethylene, polypropylene, or polystyrene.

UV-Curable Adhesive

In some examples, the UV-curable adhesive has a viscosity suitable for inkjet printing. In some examples, the UV-curable adhesive may have a viscosity at the jetting temperature (i.e. the temperature at which it is jetted, e.g. at a temperature of from 20° C. to 80° C., in some examples from 20° C. to 60° C., in some examples from 40° C. to 60° C., in some examples from 45° C. to 55° C., in some examples about 50° C.) of from about 5 cP to about 20 cP In some examples, the UV-curable adhesive may have a viscosity at the jetting temperature (e.g. at 50° C.) of from about 1 cP to about 30 cP, in some examples from about 5 cP to about 20 cP, in some examples from about 10 cP to about 16 cP, in some examples from about 12 cP to about 14 cP, in some examples from about 12.5 cP to about 13.5 cP. Viscosity, when mentioned herein, refers to dynamic viscosity, unless otherwise indicated. The viscosity may be measured, for example, on a rheometer, e.g. at a constant shear rate, e.g. at a shear rate of 4000 rpm. A suitable rheometer is a Haake Rheostress 6000 available from Thermo Scientific.

In some examples, the UV-curable adhesive has a surface tension suitable for inkjet printing. In some examples, the UV-curable adhesive has a surface tension of from 20 dyne/cm to 40 dyne/cm, in some examples from 22 dyne/cm to 33 dyne/cm, in some examples from 25 dyne/cm to 29 dyne/cm, in some examples about 26 dyne/cm to 29 dyne/cm, in some examples about 27 dyne/cm. (1 dyne=$10^{-5}$N).

In some examples, the UV-curable adhesive comprises components selected from an acrylic polymer, a monofunctional monomer, a multifunctional monomer and a photoinitiator. In some examples, the UV-curable adhesive comprises an acrylic polymer, a monofunctional monomer, a multifunctional monomer and a photoinitiator.

The composition may be a jettable composition meaning that the adhesive can be used in an inkjet printing device, and jetted from the device onto a substrate. In some examples, the adhesive composition is "substantially free of solvent", and solvent may be a defined as a non-monomeric liquid (at 25° C.), i.e. a liquid, that, if present during the first and second curing would not take part in the curing, i.e. would not polymerise.

In some examples, the adhesive composition is inkjet printed in a thickness of 120 µm or less, in some examples 110 µm or less, in some examples 100 µm or less, in some examples 95 µm or less, in some examples 90 µm or less, in some examples 80 µm or less, in some examples 70 µm or less, in some examples 60 µm or less, in some examples 50 µm or less, in some examples 40 µm or less, in some examples 30 µm or less, in some examples 20 µm or less.

In some examples, the adhesive composition is inkjet printed in a thickness of from 10 µm to 120 µm, in some examples from 10 µm to 100 µm, in some examples from 10 µm to 100 µm, in some examples from 30 to 95 µm, in some examples from 40 µm to 90 µm, in some examples from 50 µm to 90 µm. In some examples, the adhesive composition is inkjet printed in a thickness of from 1 µm to 30 µm, in some examples from 10 µm to 100 µm, in some examples from 1 µm to 20 µm, in some examples from 5 to 20 µm, in some examples from 5 µm to 15 µm.

In some examples, the acrylic polymer is a non-curable acrylic polymer. A non-curable acrylic polymer may be defined as an acrylic polymer that does not contain functional groups capable of participating in a polymerisation or cross-linking reaction during curing of the adhesive composition. In other words, the non-curable acrylic polymer may be a resin that does not polymerise with the monofunctional monomer or the multifunctional monomer during the first or second curing. The presence of an acrylic polymer, particularly a non-curable acrylic polymer, in the adhesive composition may enhance flexibility and adhesion of the adhesive to the substrate and the foil.

Acrylic Polymer

The UV-curable adhesive composition may comprise an acrylic polymer, which may be a non-curable acrylic polymer as described herein. Suitable acrylic polymers include components such as styrene acrylic resins, butyl methacrylate resins, ethyl methacrylate resins, isobutyl methacrylate resins, methyl methacrylate resins, styrene acrylates or copolymers thereof in any combination. In some examples, the acrylic polymer includes polymers of methyl methacrylate, ethyl methacrylate and but methacrylate or any combination thereof. In some other examples, the acrylic polymer is an isobutyl methacrylate resin.

The acrylic polymer component may have a molecular weight in the range of about 1,000 to about 60,000 g/mole; or, in the range of about 5,000 to about 20,000 g/mole. The molecular weight may be an average molecular weight of the polymer, which may be a number average molecular weight. The molecular weight of a polymer can be determined by gel permeation chromatography, e.g. as described in Chapter 17 of Handbook of Polymer Synthesis, Characterization and Processing (First Edition, 2013, John Wiley & Sons).

In some examples, the acrylic polymer component has a glass transition temperature ($T_g$) that is below 60° C. The method of measuring the glass transition temperature ($T_g$) parameter is described in, for example, Polymer Handbook, $3^{rd}$ Edition, authored by J. Brandrup, edited by E. H. Immergut, Wiley-Interscience.

Examples of acrylic polymers include components available from Dianal America, under trade names B-7022, MB-2588, BR-115, MB-2543, BR-220, MB-2823 or MB-2494 or MB-2594 or from DSM under the trade name NeoCryl B-300.

In some examples, the acrylic polymer component is present in the adhesive composition (i.e. the UV-curable adhesive) in an amount representing from about 1% to about 10% of the total weight of the adhesive composition. In other examples, the acrylic polymer component is present in the adhesive composition in an amount representing from about 1% to about 5% of the total weight of the adhesive composition, in some examples from about 1% to about 3% of the total weight of the adhesive composition.

In some examples, the acrylic polymer is formed from an alkyl (meth)acrylate monomer. The alkyl acrylate monomer may be a C1 to C10 alkyl (meth)acrylate monomer. '(meth)' indicates that meth may or may not be present. In some examples, the acrylic polymer is formed from a C1 to C10 alkyl methacrylate monomer. In some examples, the acrylic polymer is formed from a first C1 to C10 alkyl methacrylate monomer and a second C1 to C10 alkyl methacrylate monomer, with C1 to C10 alkyl chain of the first monomer being shorter than the C1 to C10 alkyl chain of the second monomer. The first monomer may, for example, be selected from a methyl methacrylate and an ethyl methacrylate and the second monomer may be selected from a C3 to C10 alkyl methacrylate.

In some examples, the acrylic polymer component comprises a methyl methacrylate/butyl methacrylate copolymer. This acrylic polymer may be present in an amount representing from about 1 to about 10%, in some examples from about 1% to about 3% of the total weight of the adhesive composition.

Monofunctional Monomer

The UV-curable adhesive composition may comprise a monofunctional monomer. A monofunctional monomer is a compound containing one functional group per molecule that is capable of participating in a polymerisation reaction during curing of the adhesive composition. In particular, the monofunctional monomer has a functional group that reacts in a free radical curing reaction.

Without being bound by any theory, it is believed that the monofunctional monomer acts as a reactive diluent for the polymer, controls viscosity, reduce shrinkage, enhance flexibility and control adhesion of the adhesive to the media substrate and foil. In some examples, a combination of two or more monofunctional monomers is used in the UV-curable adhesive composition in order to optimise adhesive properties.

Monofunctional monomer can be acrylate, methacrylate or vinyl monomer. In some examples, the monofunctional monomer is selected from the group consisting of acrylic, methacrylic, vinyl type monomers and any combination of these.

The acrylate monomer can also be modified or derivatised acrylate monomer. The acrylic monomer can be selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, isobornyl methacrylate and combinations of two or more thereof. In some examples, monofunctional monomers are vinyl monomers. Such vinyl monomers can be selected from the group consisting of vinyl caprolactam and divinyl ether and any combinations thereof. In some examples, the monofunctional monomer is selected from the group consisting of vinyl caprolactam, tetrahydrofurfuryl acrylate, 2-phenoxyethyl acrylate and isophoryl acrylate.

Commercially available monofunctional monomers include, for example, Isophoryl Acrylate CD 420 or 2-Phenoxyethyl Acrylate SR 339C (For Sartomer USA, LLC).

The monofunctional monomer can be present in the adhesive composition at a level of about 5 to about 15 by weight based on the total weight of the adhesive composition. In some examples, the monofunctional monomer is present in an amount representing from about 8 to about 12 by weight based on the total weight of the adhesive composition.

In some examples, the monofunctional monomer may be a mixture of 2-phenoxyethyl acrylate and lauryl acrylate. In some examples, 2-phenoxyethyl acrylate forms from about 20 to about 40% of the total weight of the adhesive composition and lauryl acrylate forms from about 5 to about 15% of the total weight of the adhesive composition. In an example, 2-phenoxyethyl acrylate form 22.5% of the total weight of the adhesive composition and lauryl acrylate forms 9.8% of the total weight of the adhesive composition.

Multifunctional Monomer

The UV-curable adhesive composition may comprise a multifunctional monomer. A multifunctional monomer is a compound containing more than one functional group that is capable of participating in the curing reaction, for example, a polymerisation reaction, during curing of the adhesive. Without being bound by any theory, it is believed that multifunctional monomer enhances curing speed of the composition and may serve as a reactive diluent for the polymer. In some examples, a combination of two or more multifunctional monomers may be used to optimise adhesive properties.

In particular, the multifunctional monomer includes more than one functional group that reacts in a free radical curing reaction, such as an ethylenically unsaturated functional group, for example a vinyl or acrylate functional group. The term "multifunctional monomer" refers to the monomer, other than the monofunctional monomer, containing more than one polymerisable functional group per molecule. The multifunctional monomer can be a difunctional monomer, i.e., containing two polymerisable functional groups per molecule; a trifunctional monomer, i.e., containing three polymerisable functional groups per molecule; or a higher order multifunctional monomer, i.e., containing four or more polymerisable functional groups per molecule.

The multifunctional monomer can be acrylate monomer containing ethylenically unsaturated radiation curable functional groups. Examples of such functional, radiation curable monomers include 3-methyl 1,5-pentanediol diacrylate, hexanediol di(meth)acrylate, tetraethylene glycol di(meth)acrylate, trimethylolpropane tri(meth)acrylate, ethoxylated trimethylol propane tri(meth)acrylate, tris(2-hydroxyethyl) isocanurate triacrylate, pentaerythritol tri(meth)acrylate, ethoxylated (4) pentaerythritol tetraacrylate, neopentyl glycol di(meth)acrylate, combinations of these, and the like.

In some other examples, the multifunctional monomer is selected from the group consisting of ethoxylated (4) pentaerythritol tetraacrylate, tetraethylene glycol diacrylate, propoxylated ethylene glycol diacrylate, dipentaerythritol pentaacrylate and their combinations. The multifunctional monomer can also be selected from the group of monomers consisting of acrylic and methacrylic type monomers and any combination of these.

In some examples the multifunctional monomer is present in an amount representing from about 50% to about 85% of the total weight of the adhesive composition. In some examples the multifunctional monomer is present in an amount representing from about 50% to about 70% of the total weight of the adhesive composition.

In some examples, the multifunctional monomer may be a mixture of two or more multifunctional monomers. In some examples, the multifunctional monomer is a mixture of di- and trifunctional monomers. In some examples, the di- and trifunctional monomers are acrylates. In an example, the difunctional monomer is an acrylate, optionally, dipropylene glycol diacrylate. In some examples, the trifunctional monomer is a mixture of two trifunctional monomers, optionally triacrylates. In an example, the trifunctional monomers are propoxylated glycerol triacrylate and ethoxylated trimethylolpropane triacrylate.

In an example, the multifunctional monomer may be a mixture of at least three multifunctional monomers, each individually present in an amount representing from about 10 to about 30% of the total weight of the adhesive composition. In an example, the multifunctional monomer is a mixture of a diacrylate and two triacrylates, each individually present in an amount representing from about 10 to about 30% of the total weight of the adhesive composition. In an example, the multifunctional monomer is a mixture of dipropylene glycol diacrylate, present in an amount representing from about 10 to about 30% of the weight of the total adhesive composition; propoxylated glycerol triacrylate, present in an amount representing from about 10 to about 30% of the weight of the total adhesive composition; and ethoxylated (15) trimethylolpropane triacrylate, present in an amount representing from about 10 to about 30% of the weight of the total adhesive composition. In an example, the multifunctional monomer is a mixture of dipropylene glycol diacrylate, present in an amount representing about 23% of the weight of the total adhesive composition; propoxylated glycerol triacrylate, present in an amount representing from about 15% of the weight of the total adhesive composition; and ethoxylated (15) trimethylolpropane triacrylate, present in an amount representing from about 14% of the weight of the total adhesive composition.

The multifunctional monomer may comprise an amine acrylate. A suitable amine acrylate is, for example, Genomer 5275, available from Rahn AG.

Photoinitiator

The UV-curable adhesive composition may comprise a photoinitiator. The photoinitiator, or UV initiator, is an agent that intitiates a reaction upon exposure to a desired wavelength of UV light to cure the adhesive composition, as described herein, after its application to an adhesive-receiving material or substrate. In some examples, the photoinitiator is a radical photoinitiator. The photoinitiator may be a single compound or a mixture of two or more compounds. In some examples, the photoinitiator is present in the adhesive composition in an amount representing from about 2% to about 10% of the total weight of the adhesive composition. In some examples, the photoinitiator is formed from a mixture of two photoinitiators, each individually present in an amount representing from about 1% to about 5% of the total weight of the adhesive composition.

Examples of radical photoinitiators include, by way of illustration and not limitation, 1-hydroxycyclohexylphenylketone, benzophenone, 2,4,6-trimethylbenzophenone, 4-methylbenzophenone, diphenyl(2,4,6-trimethylbenzoyl) phosphine oxide, phenyl bis(2,4,6-trimethylbenzoyl)phosphine oxide, 2-hydroxy-2-methyl-1-phenyl-1-propanone, benzyldimethyl ketal, 2-methyl-1-[4-(methylthio)phenyl]-2-morpholinopropan-1-one, 2-hydroxy-1-{4-[4-(2-hydroxy-2-methylpropionyl)benzyl]phenyl}-2-methylpropan-1-one, or combinations of two or more of the above. Amine synergists may also be used, such as, for example, ethyl-4-dimethylaminobenzoate, 2-ethylhexyl-4-dimethylamino benzoate.

In an example, the photoinitiator is a mixture of 2-hydroxy-1-(4-(4-(2-hydroxy-2-methylpropionyl)benzyl)phenyl)-2-methylpropan-1-one and 2,4,6-trimethylbenzoyl-diphenyl. In an example the photoinitiator is a mixture of 2-hydroxy-1-(4-(4-(2-hydroxy-2-methylpropionyl)benzyl) phenyl)-2-methylpropan-1-one, present in an amount of from about 1 to about 5%, optionally 3.5%, of the total weight of the adhesive composition and 2,4,6-trimethylbenzoyl-diphenyl, present in an amount of from about 1 to about 5%, optionally 4.5%, of the total weight of the adhesive composition.

The photocurable ink composition may include a UV stabiliser, i.e., an agent that can assist with scavenging free radicals. Examples of UV stabilisers include, by way of illustration and not limitation, quinine methide (Irgastab® UV 22 from BASF Corporation) and Genorad®16 (Rahn USA Corporation) and combinations thereof. The UV stabiliser may be present in an amount of from about 0.1 to about 3% of the total weight of the adhesive composition.

In some examples, a photosensitizer may be used with the photoinitiator in amounts ranging from about 0.01 to about 10%, or from about 1 to about 5% of the total weight of the composition. A photosensitizer absorbs energy and then transfers it to another molecule, usually the photoinitiator. Photosensitisers are often added to shift the light absorption characteristics of a system. Suitable examples of photosensitizers include, but are not limited to thioxanthone, 2-isopropyltioxanthone and 4-isopropylthioxanthone.

Other Components and Additives

Other components and additives may be present in the UV-curable adhesive composition in order to improve adhesive properties and performances. The additives may include, but are not limited to, one or more surfactants or wetting agents (e.g., surfactants containing silicone compounds or fluorinated compounds), dispersing agents, rheology modifiers, anti-molding agents, anti-foaming agents and stabilisers such as, for example, storage stability enhancing agents. The total amount of additives in the ink composition is, for example, from about 1% to about 10% or from about 2% to about 5% of the total weight of the adhesive composition.

Surfactants include, for example, those commercially available under the brand names: WET® and GLIDE® (from Evonik Tego Chemie GmbH, Essen, Germany); BYK®, for example, BYK307 (from BYK Chemie GmbH, Wesel, Germany); Dynax® (from Dynax Corp. Pound Ridge N.Y.); 3M Novec® (from 3M Energy and Advanced Materials, St. Paul Minn.); and Zonyl® FSO (from DuPont de Nemours Company, Wilmington Del.).

Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.).

Specific examples of dispersants include those commercially available from BYK Chemie GmbH under the brand names BYK®.

Examples of rheology modifiers include those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany).

There is further provided a substrate having foil adhered thereto by an adhesive, the adhesive formed from the curing of an adhesive composition comprising:
a. an acrylic polymer;
b. a monofunctional monomer;
c. a multifunctional monomer; and
d. a photoinitiator. The substrate having the foil adhered thereto may have been formed in a method as described herein and/or using an adhesive composition as described herein. All features of the method and components of the substrate, foil and adhesive composition may be as described herein.

There is further provided an ink-jettable UV-curable adhesive composition comprising:
a. an acrylic polymer;
b. a monofunctional monomer;
c. a multifunctional monomer; and
d. a photoinitiator.

The components of the adhesive composition may be as described herein. UV-curable may indicate that the adhesive composition is curable in a first and second curing as described herein. In some examples, the composition substantially lacks or lacks, i.e. does not comprise, a pigment. "Substantially lacks" indicates that the total amount of pigment maybe 0.09 wt % or less of the composition, e.g. 0.05 wt % or less of the composition. The pigment may be as defined herein, e.g. a pigment selected from a blue, brown, green, red, orange magenta, cyan, yellow or black pigment. Pigments can adversely affect the adhesive properties of the composition and the resultant print quality when used in a foiling method as described herein. The adhesive composition may lack, for example, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, isoindolinone pigments, dioxazine pigments, carbazole dioxazine violet pigments, alizarine lake pigments, phthaloxy amine pigments, carmine lake pigments, tetrachloroisoindolinone pigments, perinone pigments, thioindigo pigments, anthraquinone pigments and quinophthalone pigments.

The composition may lack inorganic pigments, for example metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides and metal chlorides.

The composition may lack yellow pigments having the following Yellow Pigment color index PY 83, PY 151, PY 150, PY 155, PY 139, PY120, PY180, PY 129 and PY 154, PY213. The composition may lack magenta pigments composed of Red pigment having color indices of PR 202, PR 254, PR 122, PR149, PR185, PR255, PR146 and the composition may lack violet pigment having color indices of PV 19, PV 23, PV37 and PV 29. The composition may lack blue pigments having color indices of PB 15:3, PB 15:4, PB15:2 and PB15:1, as well as black pigments having color indices of PBL Black 7. The composition may lack inorganic pigments such as a white pigment of the type $TiO_2$. The composition may lack orange pigment having color indices of PO46, PO64, PO34 as well as green pigments having color index of PG7.

The ink-jettable UV-curable adhesive composition may be a colourless and/or a transparent composition e.g. when printed on a substrate at a thickness of 120 μm or less.

EXAMPLES

The following illustrates examples of the methods and other aspects described herein. Thus, these Examples should not be considered as limitations of the present disclosure, but are merely in place to teach how to make examples of the present disclosure.

Example 1: Adhesive Formulation

An adhesive formulation was prepared by using the proportions of ingredients provided in Table 1 below by first combining the mono- and multifunctional monomers, then adding the stabilizer and surfactants and mixing for about 5 minutes. The non-curing acrylic polymer was then added to the monomer mixture and the solution mixed until it became clear (about 15 minutes). Finally, the photoinitiators were added and the solution mixed until it became clear (about 15 minutes). Once prepared the adhesive mixture was filtered using a filtration unit.

Table 1 shown on next page.

TABLE 1

| Chemical/Component Name, Function and Source | CAS No. (if known) | Trade Name/ Synonym #1 | Trade Name/ Synonym #2 | % | Range |
|---|---|---|---|---|---|
| MMA/BMA copolymer* [non-curing acrylic polymer (obtainable from DSM-AGI Corporation) | | Neocryl B-300 | | 2 | 1-10% |
| Propoxylated (3) glycerol triacrylate, (obtainable from Sartomer) [multifunctional monomer] | 52408-84-1 | SR9020 | | 15 | 10-30% |
| Ethoxylated (15) trimethylolpropane triacrylate (obtainable from Sartomer) [multi-functional monomer | 28961-43-5 | CN435 | SR9035 | 14 | 10-30% |
| Dipropylene glycol diacrylate—(obtainable from Sartomer) [multifunctional monomer] | 57472-68-1 | SR508 | | 23 | 10-30% |
| 2-phenoxyethyl acrylate—(obtainable from Sartomer) [monofunctional monomer] | 48145-04-6 | SR339C | | 22.5 | 20-40% |
| lauryl acrylate [monofunctional monomer] (obtainable from Sartomer) | 2156-97-0 | SR335 | | 9.8 | 5-15% |
| Amine Acrylate [multi-functional oligo-amine (oligomer), available from Rahn] | <5%: 13048-33-4; rest: no CAS | Genomer 5275 | | 5 | 1-10% |

TABLE 1-continued

| Chemical/Component Name, Function and Source | CAS No. (if known) | Trade Name/ Synonym #1 | Trade Name/ Synonym #2 | % | Range |
|---|---|---|---|---|---|
| Stabilizer (available from Rahn) | 50%: 52408-84-1; 4%: 150-76-5; rest: unknown | Genorad16 | | 0.5 | 0.1-3% |
| Surfactant (available from BYK) | | Byk307 | | 0.2 | 0.05-2% |
| 2-hydroxy-1-{4-[4-(2-hydroxy-2-methylpropionyl)benzyl]phenyl}-2-methylpropan-1-one [Photo-initiator] (available from BASF) | 474510-57-1 | Irg127 | | 3.5 | 1-5% |
| 2,4,6-Trimethylbenzoyl-diphenylphosphine oxide [Photo-initiator] (available from SigmaAldrich or IGM Resins) | 75980-60-8 | TPO | | 4.5 | 1-5% |

*Copolymer used: NeoCryl B-300, available from DSM-AGI Corporation (methyl methacrylate (MMA)/butyl methacrylate (BMA) copolymer composition with a molecularweight of 16 kDa, an acid value of <1 and a $T_g$ of 45° C.).

Viscosity

The formulation viscosity was measured with a HAAKE Rheostress 600 Rheometer from Thermo Company at 50° C. and a constant shear rate program of 4000 rpm. The viscosity was 13 cP.

Surface Tension

The formulation surface tension was measured with a LAUDA TD1 instrument. The surface tension was: 27 dyne/cm

Example 2: Printing, Pinning and Foil Application Setup

Adhesive was printed on a vinyl substrate using an experimental printer test-bed equipped with HP Sparrow piezo print heads. The resolution of the printer was 600 dpi×600 dpi. The printing speed was set at 0.8 m/sec. Immediately after printing, the image was subjected to a first curing with an LED unit (Baldwin, power 8 wt, with a UV wavelength of 395 nm) using a variable UV dosage. Dosages of 25, 80, 135, 165, 195, 240, 260 and 270 mJ/cm$^2$ were tested. The exposure time was constant for all of the experiments and equalled 0.05 sec. After the first curing, the piece of foil was pressed against the partially cured image using an Eclipse laminator PDA3-330 CA with no heat applied. The laminator thickness was set to 100 µm. The foil in this case (and as used in all Examples) was Luxor® Alufin® KPW by Kurz, having a thickness of 24 microns.

The next step was the second curing through the foil with the same LED unit, using a high UV dosage (and a single pass under the LED, although more passes could be used if desired), i.e. a dosage of at least 250 mJ/cm$^2$. The excess foil was manually separated from the substrate and the image quality was evaluated.

UV Dosage Measurement

The LED UV dosage was measured by using a UV Power Puck 2 radiometer (EIT, inc.). A bandwidth UVA2 of 375-415 nm was used for the measurements.

Results

Visual analysis of the foil on the printed substrates showed that an initial UV dosage of 165 mJ/cm$^2$ produced the highest print quality and adhesion with the foil.

Example 3: Flexibility Evaluation

Cured adhesive film flexibility evaluation was performed according to the method described in the international patent application WO2005/026270A1:

Drawdowns of different thicknesses (see Table 2) were made on a vinyl substrate. The drawdown was carried out by using a coating apparatus (a K Control Coater, which is, for example, available from RK Printcoat Instruments) to apply adhesive in a layer of the appropriate thickness. After curing under Arc lamp (which emits with a UV range of from 230 nm to 450 nm) to fully cure the adhesive, the flexibility was measured by taking opposite corners of the vinyl rectangles with the cured adhesive layer, and folding them to form a rectangle half of the original size, with the adhesive layer on the outside, bringing the two inside faces into contact with each other with finger pressure, at a decreasing distance from the fold line, until the inside faces are in contact with each other at a distance equal to, and not less than 3 mm from the fold line.

The folded vinyl sheet was then held in this position for 5 seconds. The level of adhesive cracking on the fold was visually assessed. The amount of white area showing the substrate underneath was used as a measure of the level of cracking. Less white area showed that there was less cracking. The presence or absence of white areas was recorded as shown in Table 2.

TABLE 2

| Flexibility evaluation | | |
|---|---|---|
| Adhesive film thickness | Adhesive with non-curable acrylic copolymer | Adhesive without non-curable acrylic copolymer |
| 60 µm | no cracks | no cracks |
| 72 µm | no cracks | minor cracks |
| 84 µm | no cracks | many small cracks |
| 90 µm | no cracks | big cracks |
| 102 µm | minor cracks | big cracks |
| 108 µm | small cracks | big cracks |
| 114 µm | big cracks | big cracks |

Example 4: Adhesion Evaluation

Adhesion of fully cured adhesive with and without non-curable acrylic copolymer to the substrate (without the foil).

Evaluation Method

Apply 12 µm layer of adhesive by automatic draw-down onto the substrate (in the manner described above), and fully cure it under an Arc lamp. Test adhesion by using the cross-cut tape test according to ASTM D 3359-02; 3M Scotch tape 250YT.

TABLE 3

| | Adhesion evaluation (score: 5: best, 0: worst) | |
|---|---|---|
| Media type | Adhesive without non-curable acrylic copolymer | Adhesive with non-curable acrylic copolymer |
| SAV (Vinyl) | 5 | 5 |
| Poly(vinyl chloride) (PVC) | 5 | 5 |
| Foam PVC | 5 | 5 |
| Fluted polypropylene | 1 | 5 |
| Polypropylene | 1 | 5 |
| Polystyrene | 5 | 5 |
| Polycarbonate | 5 | 5 |
| Polyethylene teraphlate glyco-modified (PETG) | 2 | 5 |
| PMMA (Acrylics) | 1 | 5 |

Example 5: Adhesion of Foil to the Adhesive

Evaluation Method

Apply 12 μm layer of adhesive on the substrate by automatic draw-down (in the manner described in Example 3), partially cure it (the first curing step) under Arc and apply the foil using a laminator. The foil in this case (and as used in all Examples) was Luxor Alufin KPW by Kurz, having a thickness of 24 microns. Fully cure the adhesive through the foil (the second curing step). Place the 3M Scotch tape 250YT onto the foil, smooth the tape into place with a finger and then rub firmly with an eraser on the end of a pencil. Within 90±30 s of application, remove the tape by seizing the free end and pulling it off rapidly (not jerked) back upon itself at as close to a 180° angle as possible (taken from D3359-02 ASTM but without the cross-cut).

| Media type | Adhesive without non-curable acrylic copolymer | Adhesive with non-curable acrylic copolymer |
|---|---|---|
| SAV (Vinyl) | 1 | 4 |

While the process and related aspects have been described with reference to certain examples, those skilled in the art will appreciate that various modifications, changes, omissions, and substitutions can be made without departing from the spirit of the disclosure. It is intended, therefore, that the process and related aspects be limited by the scope of the following claims. The features of any dependent claim can be combined with the features of any of the other dependent claims, and any independent claim.

The invention claimed is:

1. A method of applying foil from a foil web to a substrate, the method comprising:
   ink-jet printing a UV-curable adhesive onto the substrate in a predetermined image area, wherein the UV-curable adhesive comprises:
   a non-curable acrylic polymer;
   a monofunctional monomer;
   a multifunctional monomer; and
   a photoinitiator;
   subjecting the adhesive to a first curing by exposing the adhesive to UV light in a dosage range of 140-170 mJ/cm$^2$;
   passing the substrate and a foil web through a nip where the foil web is pressed against the adhesive;
   subjecting the adhesive disposed between the substrate and the foil web to a second curing by exposing the adhesive to UV light in a dosage of at least 250 mJ/cm$^2$; and
   separating excess foil from the substrate, to leave foil on the predetermined image area;
   wherein the non-curable acrylic polymer is a resin that does not polymerize with the monofunctional monomer or the multifunctional monomer during either of the first or second curing.

2. The method of claim 1, wherein the non-curable acrylic polymer is present in the UV-curable adhesive in an amount representing from about 1% to about 10% of the total weight of the UV-curable adhesive.

3. The method of claim 1, wherein the non-curable acrylic polymer has a molecular weight in the range of from about 5,000 to about 20,000 Daltons and/or has a glass transition temperature ($T_g$) that is below 60° C.

4. The method of claim 1, wherein the non-curable acrylic polymer is selected from the group consisting of styrene acrylic resins, butyl methacrylate resins, ethyl methacrylate resins, isobutyl methacrylate resins, methyl methacrylate resins, styrene acrylates, and copolymers thereof.

5. The method of claim 1, wherein the non-curable acrylic polymer comprises a copolymer of methyl methacrylate and butyl methacrylate.

6. The method of claim 1, wherein the UV-curable adhesive has a viscosity, before the first curing and when measured at the temperature at which the adhesive will be when ink-jet printed onto the substrate (the jetting temperature), of from about 5 cP to about 20 cP.

7. The method of claim 1, wherein the adhesive is printed in a thickness of about 95 μm or less.

8. The method of claim 1, wherein the monofunctional monomer and the multifunctional monomer each comprise at least one acrylate group.

9. The method of claim 1, wherein the foil that is left on the predetermined image area comprises a film or sheet having a thickness of about 200 μm or less.

10. The method of claim 1, wherein the UV light source is an LED UV source.

11. The method of claim 1, wherein the UV light has a wavelength in a range of from 315 nm to 450 nm.

12. The method of claim 1, wherein the non-curable acrylic polymer comprises an isobutyl methacrylate resin.

* * * * *